(12) United States Patent
Cadotte, Jr. et al.

(10) Patent No.: US 10,894,253 B2
(45) Date of Patent: Jan. 19, 2021

(54) PIPETTE WITH IMPROVED READABILITY AND TOUGHNESS

(71) Applicant: Corning Incorporated, Corning, NY (US)

(72) Inventors: John Claude Cadotte, Jr., Waterboro, ME (US); Cristina Carmela Emphasis King, York, ME (US); Venu Krishna Pillai, North Andover, MA (US); James Mark Seymour, Portland, ME (US); Kimberly Sue Wayman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 205 days.

(21) Appl. No.: 15/579,760

(22) PCT Filed: Jun. 8, 2016

(86) PCT No.: PCT/US2016/036280
§ 371 (c)(1),
(2) Date: Dec. 5, 2017

(87) PCT Pub. No.: WO2016/200849
PCT Pub. Date: Dec. 15, 2016

(65) Prior Publication Data
US 2018/0161768 A1 Jun. 14, 2018

Related U.S. Application Data

(60) Provisional application No. 62/172,483, filed on Jun. 8, 2015.

(51) Int. Cl.
*B01L 3/02* (2006.01)
*C08L 25/06* (2006.01)

(52) U.S. Cl.
CPC .............. *B01L 3/021* (2013.01); *C08L 25/06* (2013.01); *B01L 2200/12* (2013.01);
(Continued)

(58) Field of Classification Search
CPC .... B01L 3/0234; B01L 3/0231; B01L 3/0227; B01L 3/0224; B01L 3/022; B01L 3/0217;
(Continued)

(56) References Cited

U.S. PATENT DOCUMENTS 2,972,889 A 2/1961 Offutt
5,058,441 A 10/1991 Whelan
(Continued)

FOREIGN PATENT DOCUMENTS

CN 101245163 A 8/2008
CN 101250306 A 8/2008
(Continued)

OTHER PUBLICATIONS

Tsai, Yuhsin et al, "Optical Transparency, thermal resistance, intermolecular interaction, and mechanical properties of poly(styrene-butadiene-styrene) copolymer-based thermoplastic elastomers," Dec. 1, 2009, Journal of Applied Polymer Science, vol. 116, 172-178 (Year: 2009).*

(Continued)

*Primary Examiner* — Benjamin R Whatley
*Assistant Examiner* — Brittany I Fisher
(74) *Attorney, Agent, or Firm* — F. Brock Riggs

(57) ABSTRACT

A serological pipette has an elongated hollow tubular body having an optical transmission of 40 to 70% over a range of 390 to 700 nm. The pipette body is formed from a polymer composition that includes 5 to 30 wt. % poly(styrene-butadiene-styrene) and 70 to 95 wt. % polystyrene. The tubular body is formed by extrusion at a barrel temperature ranging from 400 to 500 F.

12 Claims, 6 Drawing Sheets

(52) U.S. Cl.
CPC . *B01L 2300/028* (2013.01); *B01L 2300/0832* (2013.01); *B01L 2300/12* (2013.01); *C08L 2203/02* (2013.01); *C08L 2205/025* (2013.01)

(58) Field of Classification Search
CPC ...... B01L 3/0213; B01L 3/021; B01L 3/0289; B01L 3/0237; B01L 3/0293; G01N 1/02; G01N 1/10; G01N 2001/1056
USPC .................................................. 422/516, 500
See application file for complete search history.

(56) References Cited

U.S. PATENT DOCUMENTS

| | | | |
|---|---|---|---|
| 5,563,356 | A | 10/1996 | Mussi et al. |
| 6,343,717 | B1 | 2/2002 | Zhang et al. |
| 8,690,981 | B2 | 4/2014 | Mao |
| 9,849,245 | B2 | 12/2017 | Osman et al. |
| 2005/0137368 | A1 | 6/2005 | Weng et al. |
| 2012/0096957 | A1 | 4/2012 | Ochman |
| 2013/0309144 | A1 | 11/2013 | Yu |
| 2014/0260697 | A1* | 9/2014 | Staton .................... B01L 3/021 73/864.01 |

FOREIGN PATENT DOCUMENTS

| | | |
|---|---|---|
| CN | 102229790 A | 11/2011 |
| CN | 104174447 A | 12/2014 |
| CN | 104177718 A | 12/2014 |
| FR | 2258896 A1 | 8/1975 |
| JP | 62028390 A | 2/1987 |
| JP | 63045925 A | 2/1988 |
| JP | 07198727 A | 8/1995 |
| JP | 2005181288 A | 7/2005 |
| WO | 2013181163 A1 | 12/2013 |

OTHER PUBLICATIONS

Ibrahim, B. et al., "Morphology Studies and Mechanical Properties for PS/SBS Blends." International Journal of Engineering & Technology, vol. 12, No. 3, pp. 19-27, June 2012.

International Search Report and Written Opinion of the International Searching Authority; PCT/US2016/036280; dated Sep. 2, 2016; 12 Pages; European Patent Office.

Polystyrene and Styrolux®; BASF The Chemical Company; 48 Pages; Date Unknown; https://www.styrolution.com/product/styroflex_styrolux-684D_sku400900240714.html.

English Translation of CN201680033617.0 Office Action dated Jul. 17, 2019; 9 Pages; Chinese Patent Office.

Tan; "The Modification Research of Polystyrene Toughening and Filling" ; Chinese Master's Theses Full Text Database, Engineering Science and Technology I; Issue 3 pp. 27-29 (2005).

Translation of JP2017564006 Office Action Downloaded From Global Dossier; dated Mar. 25, 2020; 3 Pages; Japanese Patent Office.

English Translation of CN201680033617.0 Office Action dated Jun. 8, 2020; 9 Pages; Chinese Patent Office.

Zhang; "Studying on Modification of Polyolefines and Polystyrene"; Chinese Doctoral Dissertations Fulltext Database Engineering Science and Technology I; 2011; 4 Pages.

* cited by examiner

PIPETTE WITH IMPROVED READABILITY AND TOUGHNESS

This is a national stage application under 35 U.S.C. § 371 of International Application No. PCT/US2016/036280, filed on Jun. 8, 2016, which claims the benefit of priority under 35 U.S.C. § 119 of U.S. Provisional Application Ser. No. 62/172,483 filed on Jun. 8, 2015 the content of which is relied upon and incorporated herein by reference in its entirety.

BACKGROUND

Field

The present disclosure relates generally to serological pipettes, and more specifically to plastic pipettes having improved readability and mechanical toughness.

Technical Background

Serological pipettes are used in both research laboratories and manufacturing facilities for transferring liquid volumes, typically from less than 1 ml to up to about 100 ml. The pipettes can be sterile plastic and disposable, or sterilizable glass and reusable. Both kinds of pipettes use a pipettor for the aspiration and dispensation of liquids. Different sizes of pipettes can be used with the same pipettor for a variety of experimental assays. For example, serological pipettes are useful for mixing chemical solutions or cell suspensions, or transferring liquids between receptacles.

With careful attention to the level of liquid being aspirated and dispensed, serological pipettes can be used to accurately transfer liquid volumes, making graduation readability and fluid level detection desired attributes.

Plastic serological pipettes are conventionally manufactured from 100% crystal polystyrene (PS) due to its relatively low cost and optical transparency. Still, the economics for such a commodity product inspire continued efforts to decrease the cost of production, including the cost of raw materials.

Serological pipettes having high mechanical durability are also desirable, in order to avoid fracture or failure during transport or use. However, the realization of improved toughness and impact resistance is generally in conflict with decreased material utilization, as thinner walls will tend to compromise physical properties.

In view of the foregoing, manufacturing methods for making economical serological pipettes having enhanced readability and toughness as well as the resulting pipettes are desirable.

BRIEF SUMMARY

In accordance with embodiments of the present disclosure, a serological pipette comprises an elongated hollow tubular body having a transmission of 40 to 70% over a range of 390 to 700 nm. The pipette is formed (e.g., via extrusion) from a polymer composition that comprises 5 to 30 wt. % poly(styrene-butadiene-styrene) and 70 to 95 wt. % polystyrene at a forming temperature (e.g., extrusion barrel temperature) of 400 to 500° F.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 3A:
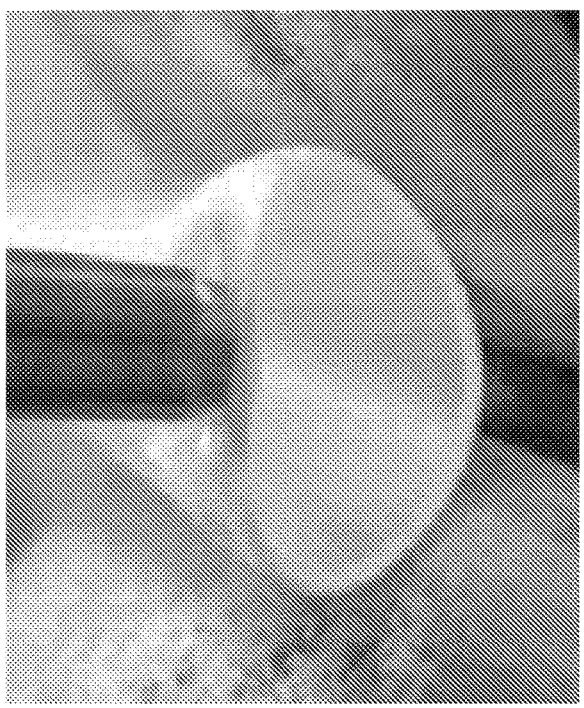
FIGS. 3A and 3B show photographs of point load deflection testing of a PS-SBS pipette and a comparative PS pipette.

Reference will now be made in greater detail to various embodiments of the subject matter of the present disclosure, some embodiments of which are illustrated in the accompanying drawings. The same reference numerals will be used throughout the drawings to refer to the same or similar parts.

In embodiments, serological pipettes exhibiting enhanced readability have an optical transparency of 40 to 70% over the range of 390 to 700 nm (e.g., 40, 45, 50, 55, 60, 65 or 70%, including ranges between any of the foregoing values). While the light transmittance is at most 70%, a clear liquid meniscus is still highly detectable due to low glare and minimal visual background disruption. Improving the readability of the pipette allows a user to operate the pipette faster due to faster meniscus detection time. As measured herein, the optical transparency data is obtained through a single wall of the pipette.

Example pipettes are fabricated from a blend of polystyrene (PS) and poly(styrene-butadiene-styrene) (SBS). The pipettes may include 5 to 30 wt. % SBS (balance PS), such as 5, 10, 15, 20, 25 or 30 wt. % SBS, including ranges between any of the foregoing values. The pipettes exhibit a finish with low gloss and intermediate light transmittance. Manufacturing conditions, and in particular the extrusion or molding temperature of the PS-SBS resin, are controlled to achieve the desired opto-mechanical properties.

Polystyrene (PS) is commercially available. An example PS material is Styron® 685D, available from Americas Styrenics. The Styron® 685D polystyrene has a Vicat softening temperature of about 225° F. SBS triblock copolymers are formed from styrene and butadiene-linked homopolymer blocks, and belong to a class of thermoplastic elastomers (TPE) that exhibit both thermoplastic behavior (the ability when heated to soften and flow like a liquid yet return to a solid state when cooled) and elastic behavior (the ability in response to an applied force to change shape and yet return to the initial shape when the force is removed). An example SBS polymer is Styrolux® 684D, available from Styrolution. The Styrolux® 684D polymer has a Vicat softening temperature of about 187° F. Alternatives to SBS include poly(styrene-ethylene butylene-styrene) (SEBS) and poly(styrene-ethylene-propylene-styrene) (SEPS).

In embodiments the melt flow index of the PS and SBS (or SBS substitute) can independently range from 1 to 30 or more, e.g., 1, 2, 5, 10, 15, 20, 25 or 30, including ranges between any of the foregoing values. In embodiments, the melt flow index of the PS and the melt flow index of the SBS are different by at least 10%, e.g., 10, 20, 50, 100, 200, 500, 1000, 2000 or 5000%, including ranges between any of the foregoing values.

In embodiments, the weight average molecular weight of the PS can range from 200,000 to 500,000 g/mol. In embodiments, the weight average molecular weight of the SBS can range from 20,000 to 200,000 g/mol.

The pipettes according to various embodiments have an internal volume ranging from 1 to 100 ml, e.g., 1, 2, 5, 10, 20, 50 or 100 ml, and a wall thickness ranging from 0.01 to 0.05 in, e.g., 0.01, 0.02, 0.03, 0.04 or 0.05 in, including ranges between any of the foregoing values. Though the overall pipette dimensions can vary depending, for instance, on the volume, an example 10 ml serological pipette has an inner diameter of 0.331 in, an outer diameter of 0.375 in, and a corresponding wall thickness of 0.022 in.

Figure 1:
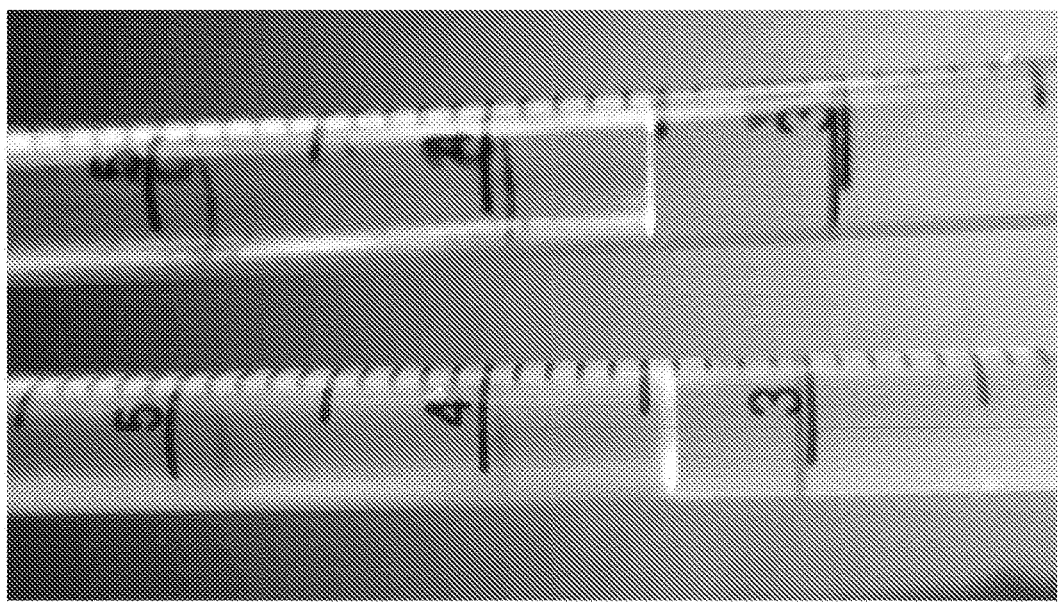
FIG. 1 is a photograph of a PS-SBS pipette and a comparative PS pipette.
Figure 2:
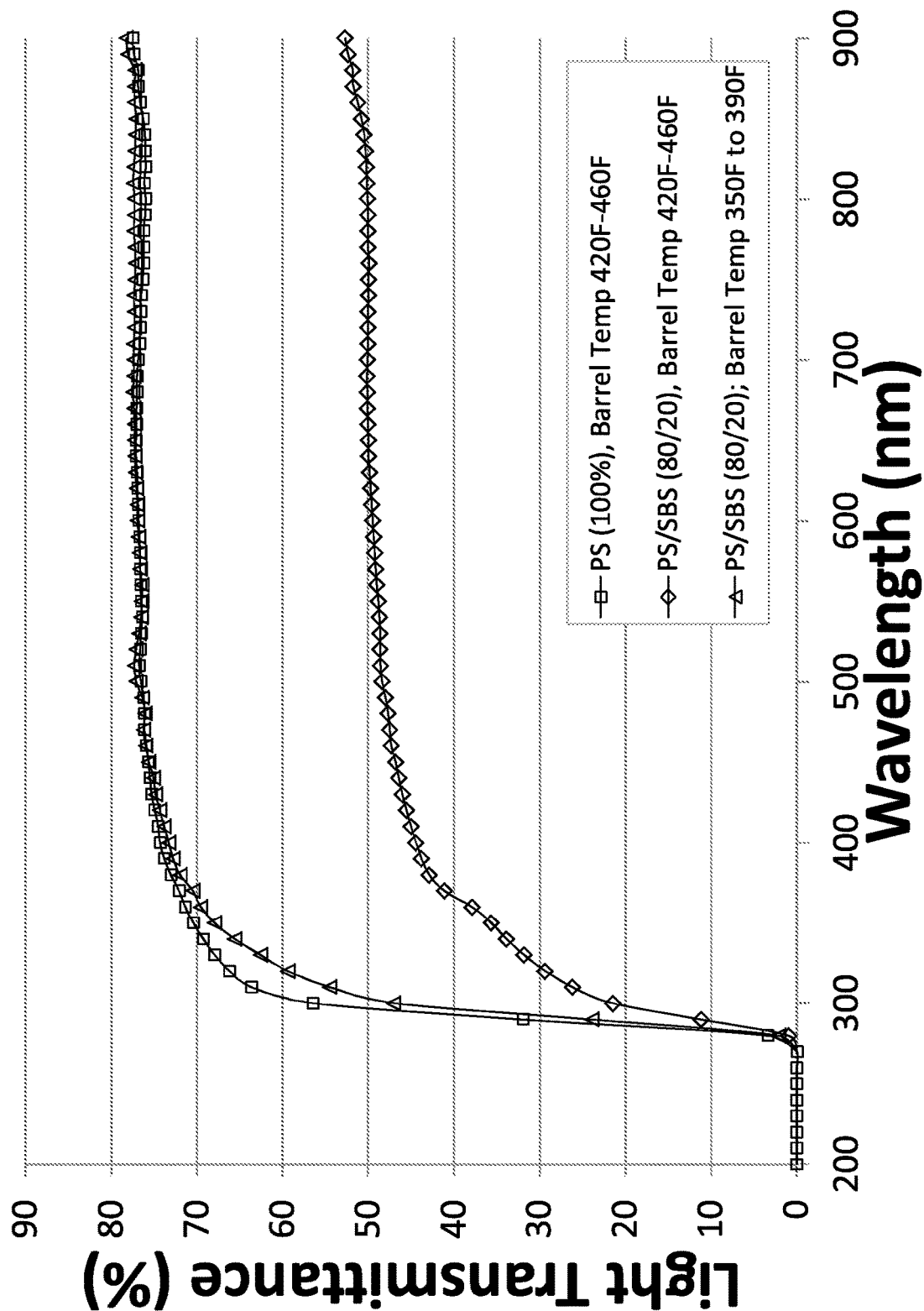
FIG. 2 is a graph of light transmittance for PS-SBS pipettes and a comparative PS pipette.

FIG. 1 is an optical micrograph of a PS/SBS (80/20) composite pipette (left) and comparative PS pipette (right). Compared with the PS pipette, which is difficult to read due to high glare and distracting background print, the PS/SBS pipette exhibits reduced glare and muted background print. Light transmittance data for PS/SBS (80/20) composite pipettes and a comparative PS pipette (wall thickness=0.022 in) are shown in FIG. 2.

Figure 3B:
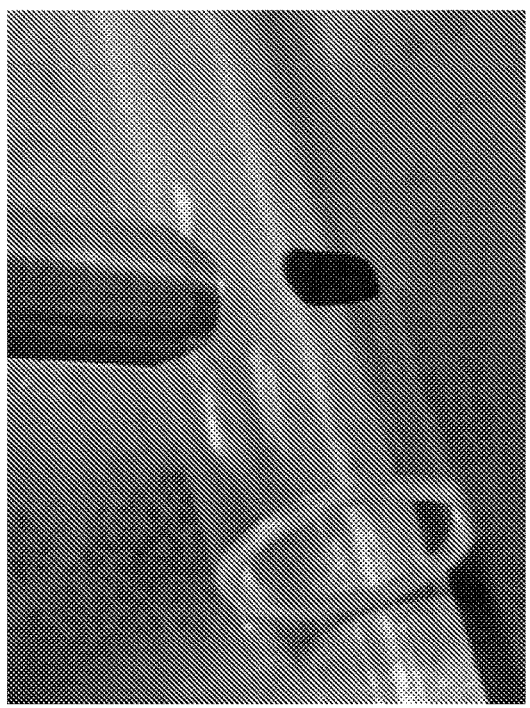

FIG. 3 are optical micrographs from point load deflection testing of a PS/SBS (80/20) composite pipette (FIG. 3A) and a comparative PS pipette (FIG. 3B). Crack initiation is observed in the PS/SBS pipette only after a deflection of 0.11 in, while the crystal PS tube cracks at a deflection of just 0.01 in. In embodiments, the serological pipettes resist cracking at deflections of 0.05 in or greater (e.g., 0.05, 0.06, 0.07, 0.08, 0.09, 0.10, 0.11, 0.12, 0.13, 0.14 or 0.15 in, including ranges between any of the foregoing).

Figure 4:
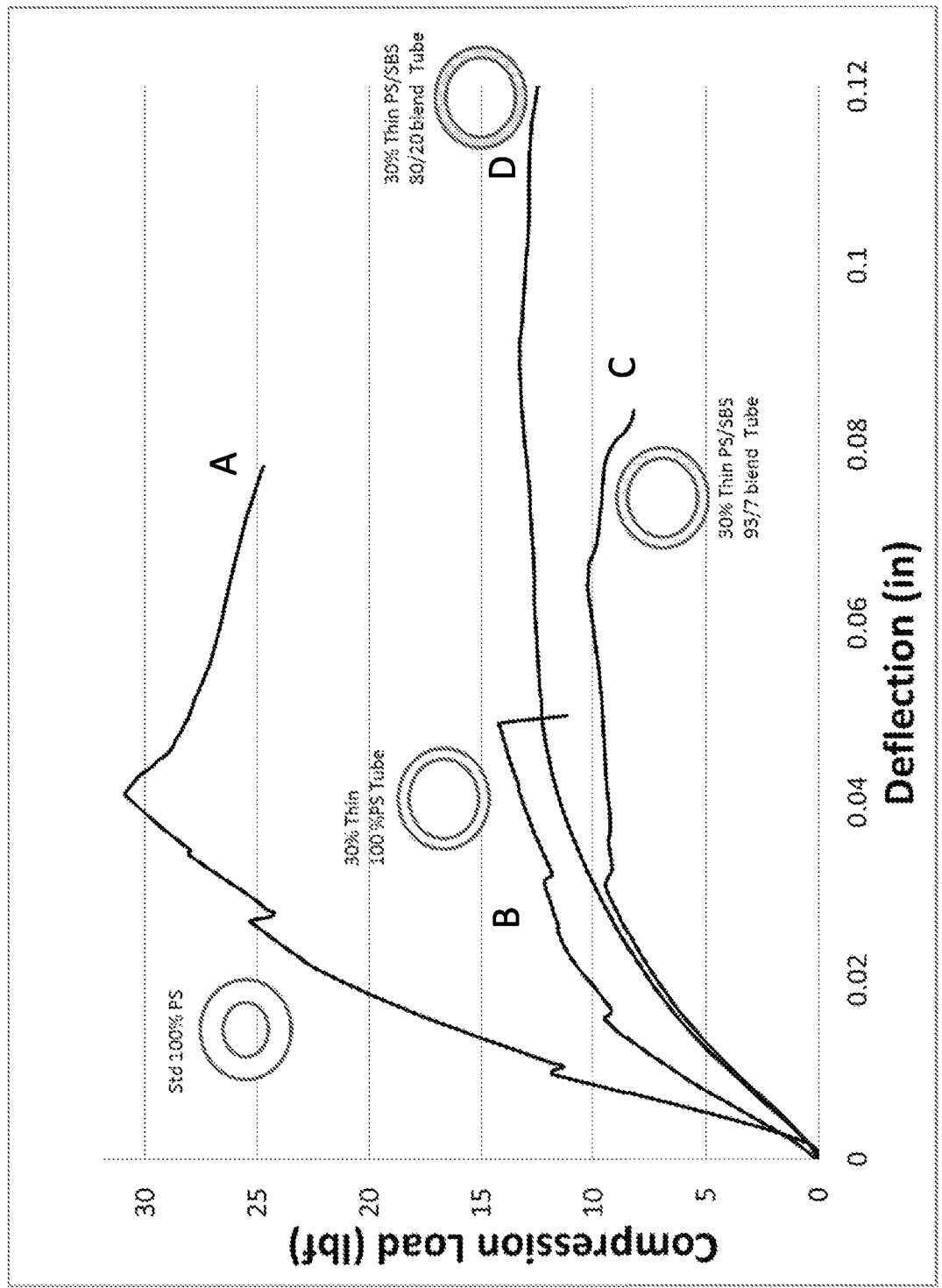
FIG. 4 is point load deflection test data for PS-SBS pipettes and comparative PS pipettes.

Instron test data for PS/SBS pipettes and comparative PS pipettes are shown in FIG. 4, which is a graph of applied load versus measured deflection for various samples where the load is recorded for a fixed crosshead setting. Curve A corresponds to a conventional PS pipette having a wall thickness of 0.032 in. Cracks initiate in the PS pipette at an applied load of about 12 lbf and further cracking is observed at a load of about 25 lbf Tube cracking manifests as a discontinuity in the load-deflection curves.

Curve B corresponds to a PS pipette with a 30% reduction in wall thickness compared to the conventional pipette (wall thickness=0.022 in). The decrease in material utilization predictably results in an earlier onset of cracking, with failure of the thin PS pipette at an applied load of less than 15 lbf. Cracking is observed in both PS pipettes (Curves A and B) at deflections of less than 0.02 in.

Curve C corresponds to a PS/SBS (93/7) thin walled pipette. The incorporation of 7 wt. % SBS marginally improves the tolerable load to a deflection of about 0.03 in. However, the PS/SBS (80/20) thin walled pipette (Curve D) exhibits no measurable cracking through 0.12 in of deflection.

Figure 5A:
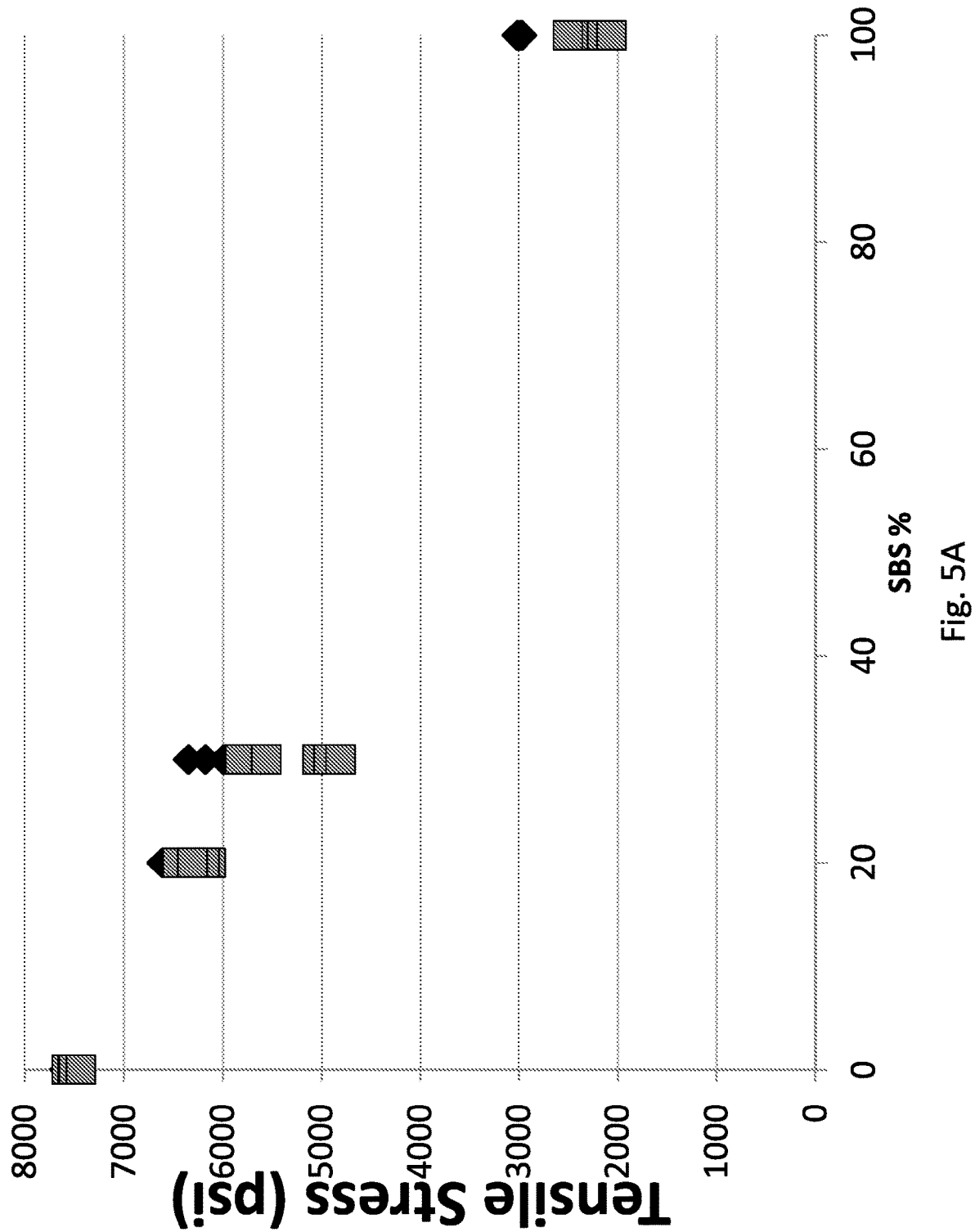
FIGS. 5A-5C are graphs of tensile properties for PS-SBS pipettes and comparative PS pipettes.
Figure 5B:
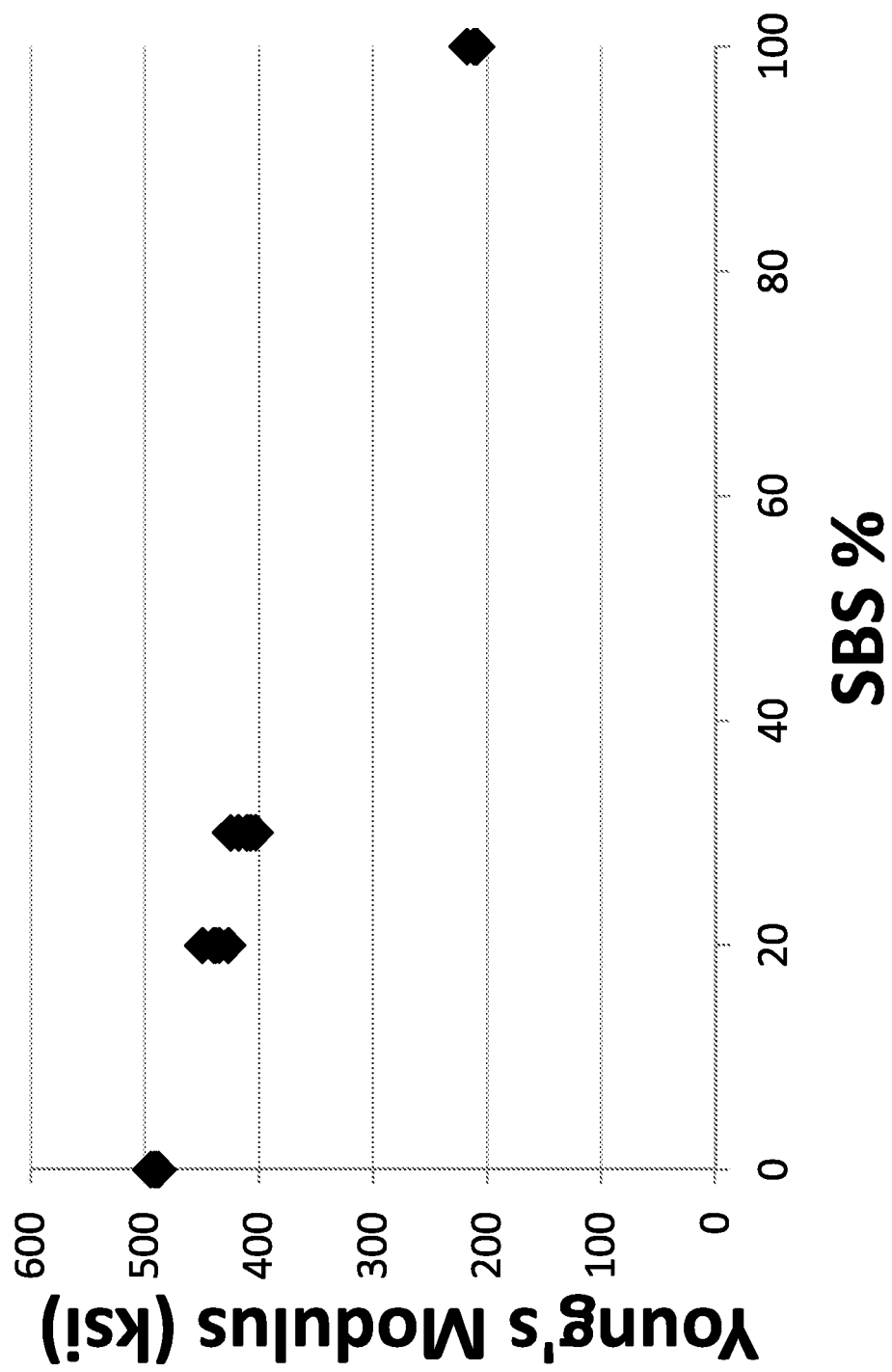
Figure 5C:
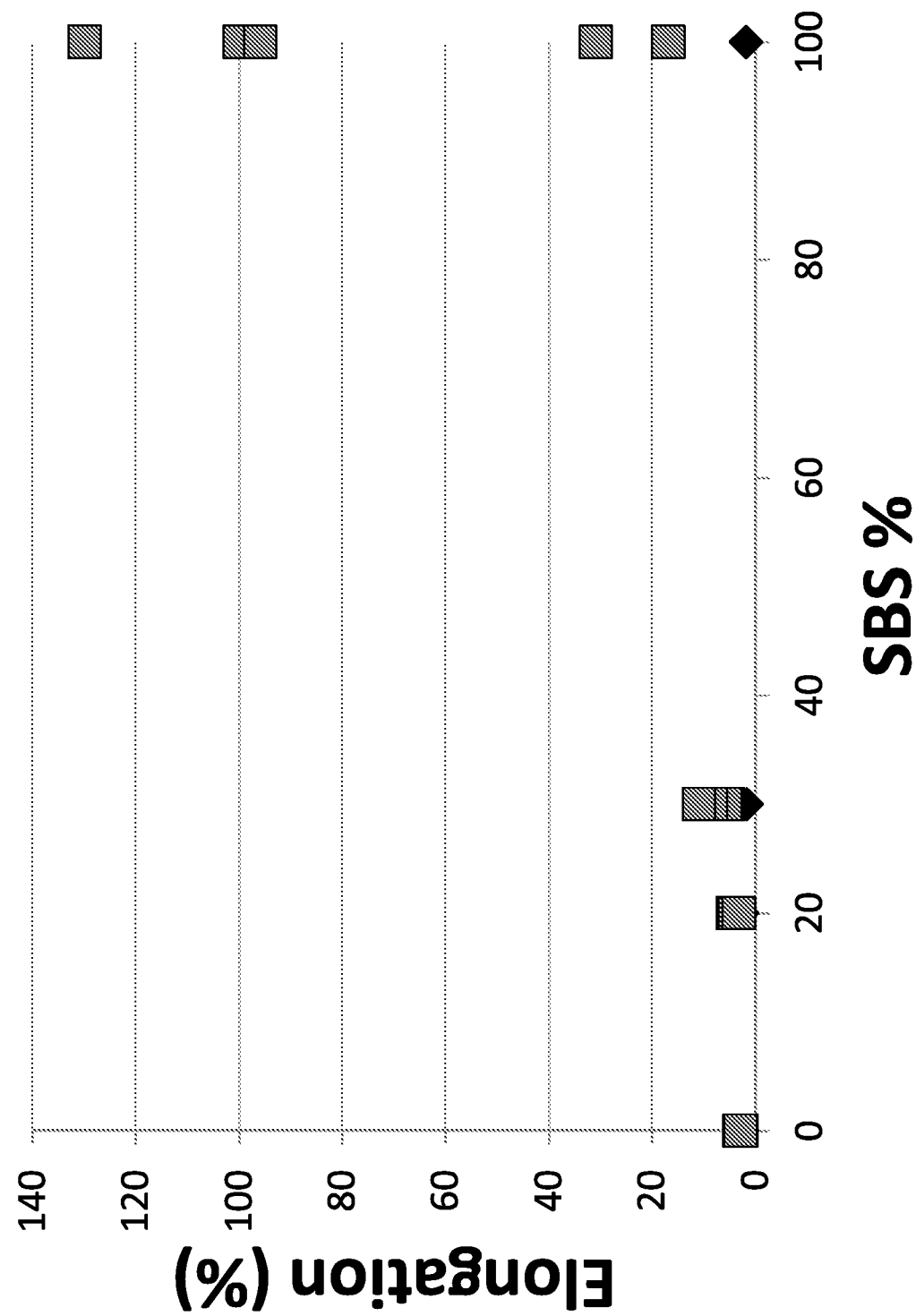

Tensile properties of pipette tubes formed from PS, SBS, and example blended compositions are summarized in FIGS. 5A-5C, and correspond to pipettes made according to Trial B (see Table 1 below). In embodiments, the serological pipettes have a tensile strength of 3500 to 7000 psi, e.g., 3500, 4000, 4500, 5000, 5500, 6000, 6500 or 7000 psi, including ranges between any of the foregoing values, a Young's modulus of 250 to 450 psi, e.g., 250, 300, 350, 400 or 450 psi, including ranges between any of the foregoing values, and/or exhibit an elongation to failure of at least 4%, e.g., 4, 6, 8, 10, 12, 14, 16, 18, 20 or 22%, including ranges between any of the foregoing values. In FIG. 5, yield data is indicated by squares and fracture data is indicated by diamonds. In embodiments, the serological pipettes have an impact resistance of at least 20 J/m, e.g., 20, 25, 30, 35, 40, 45 or 50 J/m, including ranges between any of the foregoing values.

Pipettes made using a composite composition have an improved toughness, particularly with respect to pipettes made from polystyrene alone. Thus, the PS-SBS pipettes can be manufactured with thinner walls and less stringent dimensional tolerances, improving production yield, shipping yields and end use reliability. Moreover, the viability of thinner walled tubes enables cost savings of 30 to 40%. Further, the improvement in mechanical properties may allow for the use of higher levels of reground resin by obviating the mechanical property degradation typically associated with reground stock.

Methods of manufacturing serological pipettes include tube extrusion, which can be followed by welding of tip and mouth piece components, or drawing down of the extruded tube ends to form the tip and mouth piece. In example embodiments, polystyrene (PS) and SBS polymers are hand blended at ratios (w/w) of 80/20 and 93/7. Each blend is gravity fed into a David-Standard Mark V extruder (3 inch diameter; 24:1 length:diameter ratio) to form serological pipettes.

The extruder parameters according to embodiments are summarized in Table 1. Temperatures are reported in degrees Fahrenheit.

TABLE 1

| Extruder Parameters - PS/SBS (80/20 and 93/7) | | |
|---|---|---|
| | SBS Styrolution 684D Guidelines | Trial A | Trial B |
| Tube Appearance | | Clear | Matte, hazy |
| Gear Pump | | 16 rpm | 16 rpm |
| Line Speed | | 100 fpm | 100 fpm |
| Vacuum | | 40 in | 40 in |
| Die to Die distance | | 2.5 in | 2.5 in |
| Dryer Temperature | | 160 | 160 |
| Vacuum Tank Temperature | | 80 | 80 |
| Chiller Temperature | | 50 | 50 |
| Cooling Tank Temperature | | 55 | 55 |

TABLE 1-continued

Extruder Parameters - PS/SBS (80/20 and 93/7)

| | | SBS Styrolution 684D Guidelines | Trial A | Trial B |
|---|---|---|---|---|
| Barrel | Zone 1 | 320-356 | 350 | 420 |
| Temperature | Zone 2 | 374-392 | 360 | 430 |
| | Zone 3 | 379-392 | 370 | 440 |
| | Zone 4 | 379-392 | 380 | 450 |
| | Zone 5 | 379-392 | 390 | 460 |
| Die Temperature | | 410-446 | 430 | 430 |

As seen with reference to the Table 1 data, the David-Standard extruder includes 5 zones. Short extruders (24:1 to 26:1 L/D) usually have three or four zones in all. Longer extruders (30:1 to 32:1 L/D) typically have five to six zones, while long extruders (34:1 L/D and longer) may have six to 10 zones. The material melt temperature is influenced by two factors: the thermal input and shear.

Typical processing temperatures for semi-crystalline plastics are generally about 90° to 135° F. above the melting point of the resin. For instance, high density polyethylene (HDPE) with a melting point of 266° F. is typically extruded at a barrel temperature of 356 to 401° F. If the resin is susceptible to degradation, it may be processed closer to its melting point.

The vendor-recommended extrusion temperatures for Styron® 685D polystyrene range from about 356-500° F. The vendor-recommended temperature profile for extrusion of Styrolux® 684D SBS includes minimum and maximum barrel temperatures of 320° F. and 392° F., with the stipulation that temperatures above 428° F. should be avoided. Applicants have surprisingly and unexpectedly determined that thermal processing of PS/SBS blends is sensitive to even a minority content of SBS and that PS/SBS compositions extruded at barrel temperatures greater than those recommended by the manufacturer for SBS can be used to produce pipettes having desirable opto-mechanical properties.

In embodiments, the barrel temperature during extrusion of a PS/SBS blend ranges from 400 to 500° F., e.g., 400, 410, 420, 430, 440, 450, 460, 470, 480, 490 or 500° F., including ranges between any of the foregoing values. In embodiments, the extrusion temperature in a first zone of the extruder is less than 450° F. and the extrusion temperature in a second zone of the extruder is greater than 450° F.

Optionally, the PS and SBS materials can be mixed such as with a twin screw extruder. However, such shear-based mixing may result in discoloration of the pipette. On the other hand, colorless pipettes are manufactured by adding SBS pellets to the PS pellet of the extruder, thus avoiding a high shear compounding process, even though the extrusion process temperatures are higher than the vendor's recommendation.

The unexpected and favorable colorless attribute is consistent with the light transmission data of FIG. 2, where there is no observable decrease in the light transmission, particularly in the wavelength range of 500 to 700 nm.

With continued reference to FIG. 2, the light transmittance is measured using a UV/VIS spectrometer (Perkin Elmer, model Lambda 18). Each sample is sectioned such that the light source passes through only one wall of the tube (wall thicknesses=0.022 in). Measurement variation is ±2%.

The transmission curves for a 100% PS pipette extruded at a barrel temperature of 420-460° F. and for a PS/SBS (80/20) pipette extruded at a barrel temperature of 350-390° F. (Trial A) are comparable and exhibit a transmission over the visible spectrum (390-700 nm) in excess of 70%. However, a PS/SBS (80/20) pipette extruded at a barrel temperature of 420-460° F. (Trial B) exhibits a light transmission of only 45-50% from 390-700 nm.

Notwithstanding the presence of SBS in the polymer composition, Applicants have successfully welded pipette components to the pipette body. Example welding conditions are summarized in Table 3.

TABLE 3

| Ultrasonic Welding Settings | |
|---|---|
| Horn Applied Force (lbf) | 15 |
| Welding Time (s) | 0.35 |
| Welding Peak Amplitude (microns) | 25.76 |
| Hold Time (s) | 0.01 |
| Molding Part Pusher Force (lbf) | 4.5 |
| Tube Clamp Air Pressure (psi) | 32 |
| Horn Stack Velocity (in/s) | 0.3 |

Pipettes are printed with an "off set" printing process. Ink adhesion is tested with a tape test.

According to an aspect (1) of the present disclosure a serological pipette is provided. The serological pipette comprises an elongated hollow tubular body having a transmission of 40 to 70% over a range of 390 to 700 nm.

According to another aspect (2) of the present disclosure, the pipette according to aspect (1) is provided where the transmission is 45 to 55%.

According to another aspect (3) of the present disclosure, the pipette according to any of aspects (1)-(2) is provided where the tubular body comprises 5 to 30 wt. % poly (styrene-butadiene-styrene) and 70 to 95 wt. % polystyrene.

According to another aspect (4) of the present disclosure, the pipette according to any of aspects (1)-(3) is provided where the tubular body comprises 20 wt. % poly(styrene-butadiene-styrene) and 80 wt. % polystyrene.

According to another aspect (5) of the present disclosure, the pipette according to any of aspects (1)-(4) is provided wherein the tubular body has a wall thickness of 0.01 to 0.05 in.

According to another aspect (6) of the present disclosure, the pipette according to any of aspects (1)-(5) is provided having a tensile strength of 3500 to 7000 psi.

According to another aspect (7) of the present disclosure, the pipette according to any of aspects (1)-(6) is provided having a Young's modulus of 250 to 450 psi.

According to another aspect (8) of the present disclosure, the pipette according to any of aspects (1)-(7) is provided having an elongation to failure of 4 to 22%.

According to another aspect (9) of the present disclosure, the pipette according to any of aspects (1)-(8) is provided having an impact resistance of 20 to 50 Jim.

According to another aspect (10) of the present disclosure, a method of making a serological pipette is provided. The method comprises forming a polymer composition into an elongated hollow tubular body, wherein the polymer composition comprises 5 to 30 wt. % poly(styrene-butadiene-styrene) and 70 to 95 wt. % polystyrene and a forming temperature ranges from 400 to 500° F.

According to another aspect (11) of the present disclosure, the method according to aspect (10) is provided wherein the forming comprises extruding.

According to another aspect (12) of the present disclosure, the method according to aspect (11) is provided wherein the extrusion temperature ranges from 420 to 460° F.

According to another aspect (13) of the present disclosure, the method according to aspect (11) is provided wherein the extrusion temperature in a first zone is less than 450° F. and the extrusion temperature in a second zone is greater than 450° F.

According to another aspect (14) of the present disclosure, the method according to any of aspects (10-13) is provided wherein the polymer composition comprises 20 wt. % poly(styrene-butadiene-styrene) and 80 wt. % polystyrene.

As used herein, the singular forms "a," "an" and "the" include plural referents unless the context clearly dictates otherwise. Thus, for example, reference to a "SBS polymer" includes examples having two or more such "SBS polymers" unless the context clearly indicates otherwise The term "include" or "includes" means encompassing but not limited to, that is, inclusive and not exclusive.

"Optional" or "optionally" means that the subsequently described event, circumstance, or component, can or cannot occur, and that the description includes instances where the event, circumstance, or component, occurs and instances where it does not.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a pipette comprising a PS-SBS blend include embodiments where a pipette consists of a PS-SBS blend and embodiments where a pipette consists essentially of a PS-SBS blend.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

We claim:

1. A serological pipette comprising:
    an elongated hollow tubular body comprising about 5 to about 30 wt. % poly(styrene-butadiene-styrene) and about 70 to about 95 wt. % polystyrene,
    wherein the elongated hollow tubular body has a transmission of about 45 to about 55% over a range of about 390 to about 700 nm.

2. The pipette according to claim 1, wherein the tubular body comprises about 20 wt. % poly(styrene-butadiene-styrene) and about 80 wt. % polystyrene.

3. The pipette according to claim 1, wherein the tubular body has a wall thickness of about 0.01 to about 0.05 in.

4. The pipette according to claim 1, having a tensile strength of about 3500 to about 7000 psi.

5. The pipette according to claim 1, having a Young's modulus of about 250 to about 450 psi.

6. The pipette according to claim 1, having an elongation to failure of about 4 to about 22%.

7. The pipette according to claim 1, having an impact resistance of about 20 to about 50 J/m.

8. A method of making a serological pipette, the method comprising:
    forming a polymer composition into an elongated hollow tubular body,
    wherein the forming comprises extruding the polymer composition,
    wherein the polymer composition comprises about 5 to about 30 wt. % poly(styrene-butadiene-styrene) and about 70 to about 95 wt. % polystyrene and a forming temperature ranges from about 400 to about 500° F., and
    wherein the polymer composition is extruded in an extruder having at least a first zone and a second zone, wherein an extrusion temperature in the first zone is less than about 450° F. and an extrusion temperature in the second zone is greater than about 450° F.

9. The method according to claim 8, wherein during extrusion of the polymer composition in the extruder, the extrusion temperature in the first zone is at least 420° F. and the extrusion temperature in the second zone does not exceed 460° F.

10. The method according to claim 8, wherein the polymer composition comprises about 20 wt. % poly(styrene-butadiene-styrene) and about 80 wt. % polystyrene.

11. A serological pipette made according to the method of claim 8, the serological pipette comprising the elongated hollow tubular body.

12. The serological pipette of claim 11, wherein the elongated hollow tubular body has a transmission of about 40 to about 70% over a range of about 390 to about 700 nm.

* * * * *

UNITED STATES PATENT AND TRADEMARK OFFICE
CERTIFICATE OF CORRECTION

PATENT NO. : 10,894,253 B2
APPLICATION NO. : 15/579760
DATED : January 19, 2021
INVENTOR(S) : John Claude Cadotte, Jr. et al.

It is certified that error appears in the above-identified patent and that said Letters Patent is hereby corrected as shown below:

On the Title Page

On Page 2, in Column 2, item (56), Other Publications, Line 20, delete "Polyolefines" and insert -- Polyolefins --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*